(12) United States Patent
Rajan et al.

(10) Patent No.: US 7,284,010 B2
(45) Date of Patent: Oct. 16, 2007

(54) SYSTEM AND METHOD FOR STORING AND RETRIEVING A FIELD OF A USER DEFINED TYPE OUTSIDE OF A DATABASE STORE IN WHICH THE TYPE IS DEFINED

(75) Inventors: Rajeev B. Rajan, Kirkland, WA (US); Balan Sethu Raman, Redmond, WA (US); Kangrong Yan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/692,227

(22) Filed: Oct. 23, 2003

(65) Prior Publication Data

US 2005/0091255 A1    Apr. 28, 2005

(51) Int. Cl.
*G06F 17/00*    (2006.01)
(52) U.S. Cl. .............................. 707/102; 707/2; 707/4; 707/9; 707/10; 707/103 R; 707/206
(58) Field of Classification Search .............. 707/1–10, 707/100, 101, 102, 103 R, 104.1, 206, 103 Y; 705/7, 34, 35; 709/201, 203, 226, 227, 229; 715/501.1, 530, 835; 719/310
See application file for complete search history.

(56) References Cited

U.S. PATENT DOCUMENTS

| | | | |
|---|---|---|---|
| 5,297,279 A | 3/1994 | Bannon et al. | 707/103 |
| 5,437,027 A | 7/1995 | Bannon et al. | 395/600 |
| 5,799,310 A * | 8/1998 | Anderson et al. | 707/102 |
| 5,864,862 A | 1/1999 | Kriens et al. | 707/103 |
| 5,900,870 A | 5/1999 | Malone et al. | 715/866 |
| 6,047,291 A | 4/2000 | Anderson et al. | 707/103 |

(Continued)

OTHER PUBLICATIONS

Andrews, T. et al., "Combining Language and Database Advances in an Object-Oriented Development Environment", *OOPSLA Proceedings*, Oct. 4-8, 1987, 430-440.

(Continued)

*Primary Examiner*—John Breene
*Assistant Examiner*—Fred I Ehichioya
(74) *Attorney, Agent, or Firm*—Woodcock Washburn LLP

(57) ABSTRACT

A type of an object that can be persisted in a database store is defined by a user. The type definition comprises fields and behaviors, each field having a respective data type. One or more fields of the type definition may be designated as containing data of a type that is to be stored as a file outside of the database store and separately from the other fields of the type definition. When a request is received to store an object that is an instance of the user defined type, the data in any so designated field of the object is stored in a file outside of the database store, preferably within a file system of the computer on which the database store is implemented. The data in each of the other fields of the object is stored within the database store in the usual manner. The database store maintains a link, or reference, between the persisted object and the data of the field that is stored as a file outside of the database store. Applications are provided "out of band" access, via the file system of the computer, to the file in which the data of given field is stored outside the database store.

24 Claims, 9 Drawing Sheets

U.S. PATENT DOCUMENTS

| | | | | |
|---|---|---|---|---|
| 6,070,174 | A * | 5/2000 | Starek et al. | 707/206 |
| 6,108,004 | A | 8/2000 | Medl | 715/804 |
| 6,112,024 | A | 8/2000 | Almond et al. | 717/122 |
| 6,199,100 | B1 | 3/2001 | Filepp et al. | 709/203 |
| 6,199,195 | B1 | 3/2001 | Goodwin et al. | 717/104 |
| 6,223,344 | B1 | 4/2001 | Gerard et al. | 717/170 |
| 6,338,056 | B1 | 1/2002 | Dessloch et al. | 707/2 |
| 6,370,541 | B1 | 4/2002 | Chou et al. | 707/103 |
| 6,442,748 | B1 | 8/2002 | Bowman-Amuah | 717/3 |
| 6,477,580 | B1 | 11/2002 | Bowman-Amuah | 709/231 |
| 6,505,211 | B1 | 1/2003 | Dessloch et al. | 707/103 Y |
| 6,519,597 | B1 | 2/2003 | Cheng et al. | 707/10 |
| 6,549,916 | B1 | 4/2003 | Sedlar | 707/200 |
| 6,549,949 | B1 | 4/2003 | Bowman-Amuah | 709/236 |
| 6,550,057 | B1 | 4/2003 | Bowman-Amuah | 717/126 |
| 6,556,983 | B1 | 4/2003 | Altschuler et al. | 706/55 |
| 6,564,205 | B2 | 5/2003 | Iwata et al. | 707/2 |
| 6,578,046 | B2 | 6/2003 | Chang et al. | 707/4 |
| 6,606,660 | B1 | 8/2003 | Bowman-Amuah | 709/227 |
| 6,671,687 | B1 * | 12/2003 | Pederson et al. | 707/9 |
| 6,708,196 | B1 | 3/2004 | Atkinson et al. | 718/102 |
| 6,772,178 | B2 | 8/2004 | Mandal et al. | 707/204 |
| 6,785,690 | B1 * | 8/2004 | Davidson | 707/103 Y |
| 2002/0091702 | A1 | 7/2002 | Mullins | 707/100 |
| 2002/0152422 | A1 | 10/2002 | Sharma et al. | 714/13 |
| 2002/0198891 | A1 | 12/2002 | Li et al. | 707/102 |

OTHER PUBLICATIONS

Bhattacharya, S. et al., "Coordinating Backup/Recovery and Data Consistency Between Database and File Systems", *ACM SIGMOD*, Jun. 4-6, 2002, 500-511.

Biliris, A., "The Performance of Three Database Storage Structures for Managing Large Objects", *ACM SIGMOD*, 1992, 276-285.

Buneman, P. et al., "Inheritance and Persistance in Database Programming Languages", *ACM*, 1986, 4-15.

Hsiao, H.I. et al., "DLFM: A Transactional Resource Manager", *MOD*, 2000, 518-528.

Khan, L. et al., "A Performance Evaluation of Storing XML Data in Relational Database Management Systems", *WIDM*, 2001, 31-38.

Leontiev, Y. et al., "On Type Systems for Object-Oriented Database Programming Languages", *ACM Computing Surveys*, Dec. 2002, 34(4), 409-449.

Melton, J. et al., "SQL and Management of External Data", *SIGMOD Record*, Mar. 2001, 30(1), 70-77.

Papiani, M. et al., A Distributed Scientific Data Archive Using the Web, XML and SQL/MED, *SIGMOD Record*, Sep. 1999, 28(3), 56-62.

Seshadri, P., "Enhanced Abstract Data Types in Object-Relational Databases", *The VLDB Journal*, 1998, 7, 130-140.

Varlamis, I. et al., "Bridging XML-Schema and Relational Databases. A System for Generating and Manipulating Relational Databases Using Valid XML Documents", *DocENG'OL*, Nov. 9-10, 2001, 105-114.

Yoshikawa, M. et al., "XRel: A Path-Based Approach to Storage and Retrieval of XML Documents Using Relational Databases", *ACM Transactions on Internet Technology*, Aug. 2001, 1(1), 110-141.

Findler, R.B. et al., "Contract Soundness for Object-Oriented Languages", *ACM Conference on Object-Oriented Programming Systems, Languages, and Applications, OOPSLA*, 2001, 15 pages.

Harrison, C.J. et al., Structure Editors: User-Defined Type Values and Type Inference, *IEEE*, 2000, 241-247.

Michael Stonebraker, "Inclusion of New Types in Relational Data Base Systems", *IEEE International Conference on Data Engineering*, 1986, 1-19.

Berg, C., "How Do I Create Persistent Java Objects?", *Dr. Dobb's Journal*, 1997, 22(4), 98-101.

Chien, A.A., "Concurrent Aggregates (CA)-Design and Experience with a Concurrent Object-Oriented Language Based on Aggregates", *J. Parallel and Distributed Computing*, 1995, 25(2), 174-196.

Darby, C., "Object Serializatin in Java 1.1. Making Objects Persistent", *Web Techniques*, 1997, 2(9), 55, 58-59.

Frost., "Binary-Relational Storage Structures", *The Computer Journal*, 1982, 25(3), 358-367.

Fuh, Y-C. et al., "Implementation of SQL3 Structured Types with Inheritance and Value Substitutability", *Digital Symposium Collection*, 2000, Abstract Only, 2 pages.

Haverlock, K., "Object Serialization, Java, and C++", *Dr. Dobbs. Journal*, 1998, 23(8), 32, 34, 36-37.

King, et al., "TriStarp—An Investigation into the Implementation and Exploitation of Binary Relational Storage Structures", *Proc. 8 Supppl BNCOD(British National Conference on Data Bases)*, 1990, 64-84.

Adam, Nabil R., et al., "SI in Digital Libraries, Scaling on an international level requires integrating independently evolved systems," Communications of the ACM, vol. 43, No. 6, Jun. 2000, pp. 64-72.

Hull, Richard, "Managing Semantic Heterogeneity in Databases: A Theoretical Perspective," PODS '97, Tucson Arizona, 1997, pp. 51-61.

Klavans, Judith, "Data Bases in Digital Libraries: Where Computer Science and Information Management Meet," PODS 98, Seattle, Washington, 1998, pp. 224-226.

Schauble, Peter, "SPIDER: A Multiuser Information Retrieval System for Semistructured and Dynamic Data," ACM-SIGIR '93, Pittsburgh, Pennsylvania, Jun. 1993, pp. 318-327.

Shapiro, Michael, et al., "Managing Databases with Binary Large Objects," IEEE, 1999, pp. 185-193.

Suciu, Dan. "Distributed Query Evaluation on Semistructured Data," ACM Transactions on Database Systems, vol. 27, No. 1, Mar. 2002, pp. 1-62.

Wang, Ke, et al., Discovering Typical Structures of Documents: A Road Map Approach, SIGIR '98, Melbourne, Australia, 1998, pp. 146-154.

Zdonik, Stanley B., "Incremental Database Systems: Databases from the Ground Up," SIGMOD May 1993, Washington, DC, 1993, pp. 408-412.

* cited by examiner

```
1.  Serializable]
2.      [SqlUserDefinedType(Format.Structured, MaxByteSize=8000)]
3.      public class BaseItem: INullable
4.      {
5.              [SqlUdtField(IsNullable=false)]
6.              private SqlGuid m_ID;
7.
8.              [SqlUdtField(MaxSize=128, IsFixedLength=false)]
9.              private SqlString m_Name;
10.
11.             [SqlUdtProperty(FieldName="m_ID")]
12.             public SqlGuid ID
13.             {
14.                     get
15.                     {
16.                             return m_ID;
17.                     }
18.                     set
19.                     {
20.                             this.m_ID = value;
21.                     }
22.             }
23.
24.             [SqlUdtProperty(FieldName="m_Name")]
25.             public SqlGuid Name
26.             {
27.                     get
28.                     {
29.                             return m_Name;
30.                     }
31.                     set
32.                     {
33.                             this.m_Name = value;
34.                     }
35.             }
36.
37.             [SqlUdtField(IsNullable=true)]
38.             public MultiSet<PropertyAssociation> Properties;
39.
40.             #region UDT boilerplate
41.             public BaseItem()
42.             {
43.                     this.ID = new SqlGuid(Guid.NewGuid());
44.             }
45.             public override string ToString()
46.             {
47.                     return "ID " + this.ID;
48.             }
49.             [SqlUdtField]
50.             protected SqlBoolean m_IsNull = SqlBoolean.False;
51.             public bool IsNull { get { return this.m_IsNull.Value; } }
52.             public static BaseItem Null
53.             {
54.                     get
55.                     {
56.                             BaseItem s = new BaseItem();
57.
58.                             s.m_IsNull = SqlBoolean.True;
59.                             return s;
60.                     }
61.             }
62.             public static BaseItem Parse(SqlString s)
63.             {
64.                     return new BaseItem();
65.             }
66.             #endregion
67.     }
```

Fig. 1

*Class Person*

*{*

*[SqlUdtField (IsFixedLength=false; MaxSize = 100)]*
    *SqlString FirstName;*

*[SqlUdtField(MaxSize=SqlMetaData.MAX; IsFilestream=true;)]*
    *SqlBytes PhotoFS;*

*}*

SYSTEM AND METHOD FOR STORING AND RETRIEVING A FIELD OF A USER DEFINED TYPE OUTSIDE OF A DATABASE STORE IN WHICH THE TYPE IS DEFINED

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2003, Microsoft Corp.

FIELD OF THE INVENTION

The present invention relates to data storage in a computer system, and more particularly, to systems and methods for storing and retrieving a field of a user defined type outside of the database store in which the type is defined.

BACKGROUND

Microsoft SQL SERVER is a comprehensive database management platform that provides extensive management and development tools, a powerful extraction, transformation, and loading (ETL) tool, business intelligence and analysis services, and other capabilities. Two improvements to SQL SERVER have recently been implemented. First, the Microsoft Windows .NET Framework Common Language Runtime (CLR) has been integrated into the SQL SERVER database, and second, a new object, referred to as a User Defined Type (UDT), can now be created with managed code in the CLR environment and persisted in the database store.

The CLR is the heart of the Microsoft .NET Framework, and provides the execution environment for all .NET code. Thus, code that runs within the CLR is referred to as "managed code." The CLR provides various functions and services required for program execution, including just-in-time (JIT) compilation, allocating and managing memory, enforcing type safety, exception handling, thread management and security. The CLR is now loaded by SQL SERVER upon the first invocation of a .NET routine.

In previous versions of SQL SERVER, database programmers were limited to using Transact-SQL when writing code on the server side. Transact-SQL is an extension of the Structured Query Language as defined by the International Standards Organization (ISO) and the American National Standards Institute (ANSI). Using Transact-SQL, database developers can create, modify and delete databases and tables, as well as insert, retrieve, modify and delete data stored in a database. Transact-SQL is specifically designed for direct structural data access and manipulation. While Transact-SQL excels at data access and management, it is not a full-fledged programming language in the way that Visual Basic .NET and C# are. For example, Transact-SQL does not support arrays, collections, for each loops, bit shifting or classes.

With the CLR integrated into the SQL SERVER database, database developers can now perform tasks that were impossible or difficult to achieve with Transact-SQL alone. Both Visual Basic .NET and C# are modem programming languages offering full support for arrays, structured exception handling, and collections. Developers can leverage CLR integration to write code that has more complex logic and is more suited for computation tasks using languages such as Visual Basic .NET and C#.

In addition to CLR integration, SQL SERVER also adds support for User Defined Types (UDT)—a new mechanism that enables a developer to extend the scalar type system of the database. UDTs provide two key benefits from an application architecture perspective: they provide strong encapsulation (both in the client and the server) between the internal state and the external behaviors, and they provide deep integration with other related server features. Once a UDT is defined, it can be used in all the contexts that a system type can be used in SQL SERVER, including in column definitions, variables, parameters, function results, cursors, triggers, and replication.

The process of defining a UDT on a database server is accomplished as follows:

a) create a class in managed code that follows the rules for UDT creation;
b) load the Assembly that contains the UDT into a database on the server using the CREATE ASSEMBLY statement; and
c) create a type in the database using the CREATE TYPE statement that exposes the managed code UDT.

At this point, the UDT can be used in a table definition.

When a UDT definition is created in managed code, the type must meet the following requirements:

a) it must be marked as Serializable;
b) it must be decorated with the SqlUserDefinedTypeAttribute;
c) the type should be NULL aware by implementing the INullable interface;
d) the type must have a public constructor that takes no arguments; and
e) the type should support conversion to and from a string by implementing the following methods:
  1. Public String ToString( ); and
  2. Public Shared <type> Parse (SqlString s).

Co-pending, commonly assigned, patent application Ser. No. 10/692,225, filed herewith, entitled "System And Method For Object Persistence In A Database Store", which is hereby incorporated by reference in its entirety, describes another feature of UDTs in which the fields and behaviors of a CLR class definition for a UDT are annotated with storage attributes that describe a layout structure for instances of the UDT in the database store. Specifically, each field of a CLR class that defines a UDT is annotated with a storage attribute that controls the storage facets of the type, such as size, precision, scale, etc. In one embodiment, this is achieved by annotating each field with a custom storage attribute named SqlUdtField( ). This attribute annotates fields with additional storage directives. These directives are enforced when the object is serialized to disk. In addition, every managed behavior (e.g., a method that can be invoked on the UDT object, for example, to return the value of a field) defined in the CLR class is annotated with an attribute that denotes an equivalent structural access path for that managed behavior. In one embodiment, the custom attribute used for this purpose is named SqlUdtProperty( ), and the database server (e.g., SQL SERVER) assumes that the implementation of properties annotated with this custom attribute will delegate to a field specified as part of the attribute definition. This lets the server optimize access to the property structurally without creating an instance and invoking the behavior on it.

FIG. 1 is an exemplary code listing of a CLR class that defines a UDT. As shown, the CLR class has been annotated with the SqlUdtField( ) and SqlUdtProperty( ) custom attributes as described above. Specifically, the SqlUdtField( ) custom attribute has been added at lines 5, 8, 37, and 49 to annotate the respective fields of the exemplary UDT class definition. The SqlUdtProperty( ) custom attribute has been added at lines 11 and 24 to annotate the respective managed behaviors of the class.

The CLR class that defines the UDT is then compiled into a dynamic link library (dll). An Assembly containing the compiled class may then be created using the following T-SQL script commands:
create assembly test
from 'c:\test.dll'
go The following T-SQL script commands may then be used to create the UDT on the server:
create type BaseItem
external name [test]:[BaseItem]
go Once the UDT has been created on the server, a table (e.g., "MyTable") can be created defining an attribute of the table as the UDT type, as follows:
create table MyTable
(
  Item BaseItem,
  ItemId as Item::ID
)
go A new item can be added to the table, as follows:
declare @i BaseItem
set @i=convert(BaseItem,")
insert into MyTable values (@i)
go The UDT expression can then be used in a query such as: SELECT Item.ID, Item.Name FROM MyTable.

With the integration of the CLR into SQL SERVER and the ability to define UDTs from a class definition in managed code, applications can now instantiate objects of the type defined by the managed code class and have those objects persisted in the relational database store as a UDT. Moreover, the class that defines the UDT can also include methods that implement specific behaviors on objects of that type. An application can therefore instantiate objects of a type defined as a UDT and can invoke managed behaviors over them.

When an object of a class that has been defined as a UDT is instantiated in the CLR, the object can be persisted in the database store through the process of object serialization, wherein the values of the variables of the class are transferred to physical storage (e.g., hard disk). FIG. 2 illustrates the serialization of an object in memory to its persisted form on disk. The object may be persisted in the database store in a traditional relational database table of the format illustrated in FIG. 3. As shown, the table comprises a column of the specified UDT. The serialized values of a persisted object of the specified UDT occupy a cell of the UDT column.

Referring again to FIG. 2, when an application generates a query that includes a predicate or an expression that references a managed behavior of a UDT object that has been persisted in the database store (e.g., a behavior that returns the value of a field of the UDT object), the persisted object must be de-serialized (sometimes also referred to as "hydrating") and the CLR must allocate memory for the full object in order to receive its stored values. The CLR must then invoke the actual method (i.e., behavior) of the UDT class that returns the value(s) that is the subject of the query. As described in the aforementioned co-pending application Ser. No. 10/692,225, the SqlUdtField( ) and SqlUdtProperty( ) annotations in the CLR class definition of a UDT can be used by the database server to also allow direct structural access to the values of certain UDT fields without the need for object hydration.

One new technology that takes advantage of the CLR integration and the provision of UDTs in SQL SERVER is the storage platform described in co-pending, commonly assigned, patent application Ser. No. 10/646,646, filed Aug. 21, 2003, entitled "Storage Platform For Organizing, Searching, And Sharing Data," the disclosure of which is hereby incorporated by reference in its entirety. FIG. 4 is a block diagram illustrating the architecture of the storage platform 300 described in this co-pending application. The storage platform is sometimes referred to as "WinFS." As shown in FIG. 4, the storage platform 300 comprises a data store 302 implemented on a database engine 314. In one embodiment, the database engine comprises a relational database engine, such as the Microsoft SQL SERVER relational database engine.

The data store 302 implements a data model 304 that supports the organization, searching, sharing, synchronization, and security of data in the form of Items and relationships between items, as described more fully below. Specific types of Items are described in schemas, such as schemas 340, and the storage platform 300 provides tools 346 for deploying those schemas as well as for extending those schemas, as described more fully below.

A change tracking mechanism 306 implemented within the data store 302 provides the ability to track changes to the data store. The data store 302 also provides security capabilities 308 and a promotion/demotion capability 310. The data store 302 also provides a set of application programming interfaces 312 to expose the capabilities of the data store 302 to other storage platform components and application programs (e.g., application programs 350a, 350b, and 350c) that utilize the storage platform.

The storage platform still further comprises an application programming interface (API) 322, which enables application programs, such as application programs 350a, 350b, and 350c, to access the capabilities of the storage platform and to access the data stored in the database. The storage platform API 322 may be used by application programs in combination with other APIs, such as the OLE DB API 324 and the Microsoft WINDOWS Win32 API 326.

The storage platform 300 may also provide a variety of services 328 to application programs, including a synchronization service 330 that facilitates the sharing of data among users or systems. For example, the synchronization service 330 may enable interoperability with other data stores 340 having the same format as data store 302, as well as access to data stores 342 having other formats. The storage platform 300 also provides file system capabilities that allow interoperability of the data store 302 with existing file systems, such as the WINDOWS NTFS files system 318.

In at least some embodiments, the storage platform 320 may also provide application programs with additional capabilities for enabling data to be acted upon and for enabling interaction with other systems. These capabilities may be embodied in the form of additional services 328, such as an Info Agent service 334 and a notification service 332, as well as in the form of other utilities 336.

In at least some embodiments, the storage platform is embodied in, or forms an integral part of, the hardware/software interface system of a computer system. For example, and without limitation, the storage platform of the present invention may be embodied in, or form an integral part of, an operating system, a virtual machine manager (VMM), a Common Language Runtime (CLR) or its functional equivalent, or a Java Virtual Machine (JVM) or its functional equivalent.

Through its common storage foundation, and schematized data, the storage platform enables more efficient application development for consumers, knowledge workers and enterprises. It offers a rich and extensible programming surface area that not only makes available the capabilities inherent in its data model, but also embraces and extends existing file system and database access methods.

In the following description, and in various ones of the figures, the storage platform 300 of the present invention may be referred to as "WinFS." However, use of this name to refer to the storage platform is solely for convenience of description and is not intended to be limiting in any way.

The data model of the WinFS platform defines units of data storage in terms of Items, Item extensions, and Relationships. An "Item" is the fundamental unit of storage information. The data model provides a mechanism for declaring Items and Item extensions and for establishing relationships between Items. Items are the units that can be stored and retrieved using operations such as copy, delete, move, open, and so forth. Items are intended to represent real-world and readily-understandable units of data like Contacts, People, Services, Locations, Documents (of all various sorts), and so on. Item extensions are a way to extend the definition of an existing Item, and Relationships are a defined link between Items.

In WinFS, different Item types are defined for storing information. For example, Item types are defined for Contacts, People, Locations, Documents, etc. Each Item type is described by a schema that defines the properties and characteristics of a given Item. For example, a "Location" Item may be defined as having properties such as EAddresses, MetropolitanRegion, Neighborhood, and PostalAddresses. Once a schema is defined for a given Item type, deployment tools are used to translate the schema into a corresponding CLR class definition for that Item type, and then a UDT is created in the database store from the CLR class definition (in the manner described above) in order for instances of the WinFS Item type to be persisted in the database store. Using the WinFS API 322, applications (e.g., applications 350a, 350b, 350c, etc.) can create instances of the Item types supported by the data store in order to store and retrieve information from the storage platform data store. Each instance of an Item type stored in the data store has a unique identifier (e.g., Item_ID) associated with it; in one embodiment, each item identifier is a globally unique identifier, i.e. "guid." Thus, the WinFS platform leverages the CLR integration and UDT capabilities of the database store to provide a platform for storing Items of information.

As with any instance of a UDT in SQL SERVER, instances of WinFS Items are ultimately stored in tables of the database store in the manner illustrated in FIG. 3. Applications can then submit queries to the WinFS platform to search for and retrieve Items from the data store that satisfy the search criteria. FIG. 5 illustrates how a query is executed against the data store to retrieve instances of an Item type called "Person." In step (1), an application uses a "FindAll" method of the WinFS API 322 to initiate a query for all Items that satisfy a particular search criteria—in this case, all instances of the Person type in which the value in a "Birthday" field of the type is greater than a particular date (e.g., Dec. 31, 1999). At step (2), the WinFS API 322 translates the "FindALL" operation into a SQL query and submits it to the underlying database engine, e.g., SQL SERVER. In step (3), the database engine executes the query against the corresponding instances of the Person UDT and returns the stored values for each matching instance of the Person UDT. In this example, at step (4), ADO.Net turns the bits returned from the database store into CLR objects (i.e., the process of object hydration discussed above) and returns them to the WinFS API 322. ADO.Net is a component of the Microsoft .NET Framework that provides managed code access via the CLR to data sources such as SQL SERVER. The WinFS API then wraps the Person UDT objects and returns them to the application as Items of the Person type.

While the ability to create user defined types (UDTs) in a database store is a powerful capability, it would be desirable to enhance that capability to provide support for storing certain data types, such as large data types including, for example, digital images, video, audio, etc., as defined fields of a UDT. Furthermore, it would be desirable to provide "out of band" access to the large data fields of a UDT so that they could be accessed via traditional file system calls (open, close, etc.) without using the underlying query language of the database store. It would be particularly desirable for these capabilities to be provided in the context of the WinFS storage platform described above. Heretofore, these capabilities have not existed.

While the Microsoft SQL SERVER product provides the ability to designate an entire column of a relational database table as a type referred to as FILESTREAM, such that the data in the cells of that column is stored in a separate file from the relational database table, there is no ability to designate individual fields of a user defined type to be stored in that manner.

IBM's DB2 database product has a "datalinks" feature that supports the ability to link a column in a table to a file in a file system by storing a reference to the file. However, it provides only an N to 1 reference model between the cells of the column and the reference file, whereas a need exists for a 1-1 model between a cell and a file, as described above. The "datalinks" feature is also disadvantageous for the following additional reasons: (i) the programming model does not allow uniform storage and query of the separate file along with the regular relational data inside a user defined type, and (ii) the "datalinks" feature of DB2 does not allows updating of the column data stored in the referenced file via the file system.

Oracle Corporation's "IFS" product uses middle-tier software to provide access to data over a number of protocols such as SMB, HTTP, FTP, SMTP etc. The data is ultimately stored in a database. Although Oracle IFS provides an "integrated" view of different kinds of data, including large data types, the solution is implemented in middle-tier software, as opposed to in a relational database engine, and it does not satisfy the needs discussed above.

Finally, ISO/IEC 9075-9:2003 (aka SQL 2003 MED) proposes "datalinks" as a new data type. According to the proposed standard, a datalink is a value of the DATALINK data type. A datalink references some file that is not part of the SQL-environment. The file is assumed to be managed by some external file manager. A datalink is conceptually represented by a character string forming a reference to an external file; the reference is accessible by invoking operators defined in this section of ISO/IEC 9075. The character set of the reference, referred to as the datalink character set, is implementation-defined. This proposed standard does not address the desirable features discussed above.

Thus, a need still exists for a system and method that provides support for storing certain data types, such as large data types including, for example, digital images, video, audio, etc., as defined fields of a user defined type (UDT), as well as providing "out of band" access to those large data types via traditional file system calls (open, close, etc.). The present invention satisfies these needs.

SUMMARY

The present invention is directed to a system and method for storing certain data types, such as large data types, including, for example, images, video, audio, etc., as a field of a user defined type in a database store. According to the invention, a type of an object that can be persisted in the database store is defined by a user. The type definition comprises fields and behaviors, each field having a respective data type. One or more fields of the type definition may be designated as containing data of a type that is to be stored as a file outside of the database store and separately from the other fields of the type definition. When a request is received to store an object that is an instance of the user defined type, the data in any so designated field of the object is stored in a file outside of the database store, preferably within a file system of the computer on which the database store is implemented. The data in each of the other fields of the object is stored within the database store in the usual manner. The database store maintains a link, or reference, between the persisted object and the data of the field that is stored as a file outside of the database store.

According to another aspect of the invention, applications are provided access, via the file system of the computer, to the file in which the data of a given field is stored outside the database store. More specifically, an application may generate a call, via an application programming interface to the file system of the computer, to open the file, wherein the call identifies the field of the object by its identity within the database store. Based on the identity of the field of the object within the database store, a file system path to the file containing the data of that field is determined. The call to open the file is then executed using the determined path.

Thus, the present invention enables a field of a user defined type of an object that can be persisted in a database store to be designated for storage outside of the database store, i.e., as a file within the file system of the computer on which the database store is implemented. Moreover, access to the file containing the data of that field of the user defined type is provided via the file system of the computer.

Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings:

FIG. 1 is an exemplary code segment illustrating a managed code class definition for a user defined type;

DETAILED DESCRIPTION OF THE INVENTION

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As stated above, the present invention is directed to a method for storing certain data types, such as large data types including, for example, digital images, video, audio, etc., as a field of a user defined type in a database store. According to the invention, a type of an object that can be persisted in the database store is defined by a user. The type definition comprises fields and behaviors, each field having a respective data type. One or more fields of the type definition may be designated as containing data of a type that is to be stored as a file outside of the database store and separately from the other fields of the type definition. When a request is received to store an object that is an instance of the user defined type, the data in any so designated field of the object is stored in a file outside of the database store, preferably within a file system of the computer on which the database store is implemented. The data in each of the other fields of the object is stored within the database store in the usual manner. The database store maintains a link, or reference, between the persisted object and the data of the field that is stored as a file outside of the database store.

Figure 2:
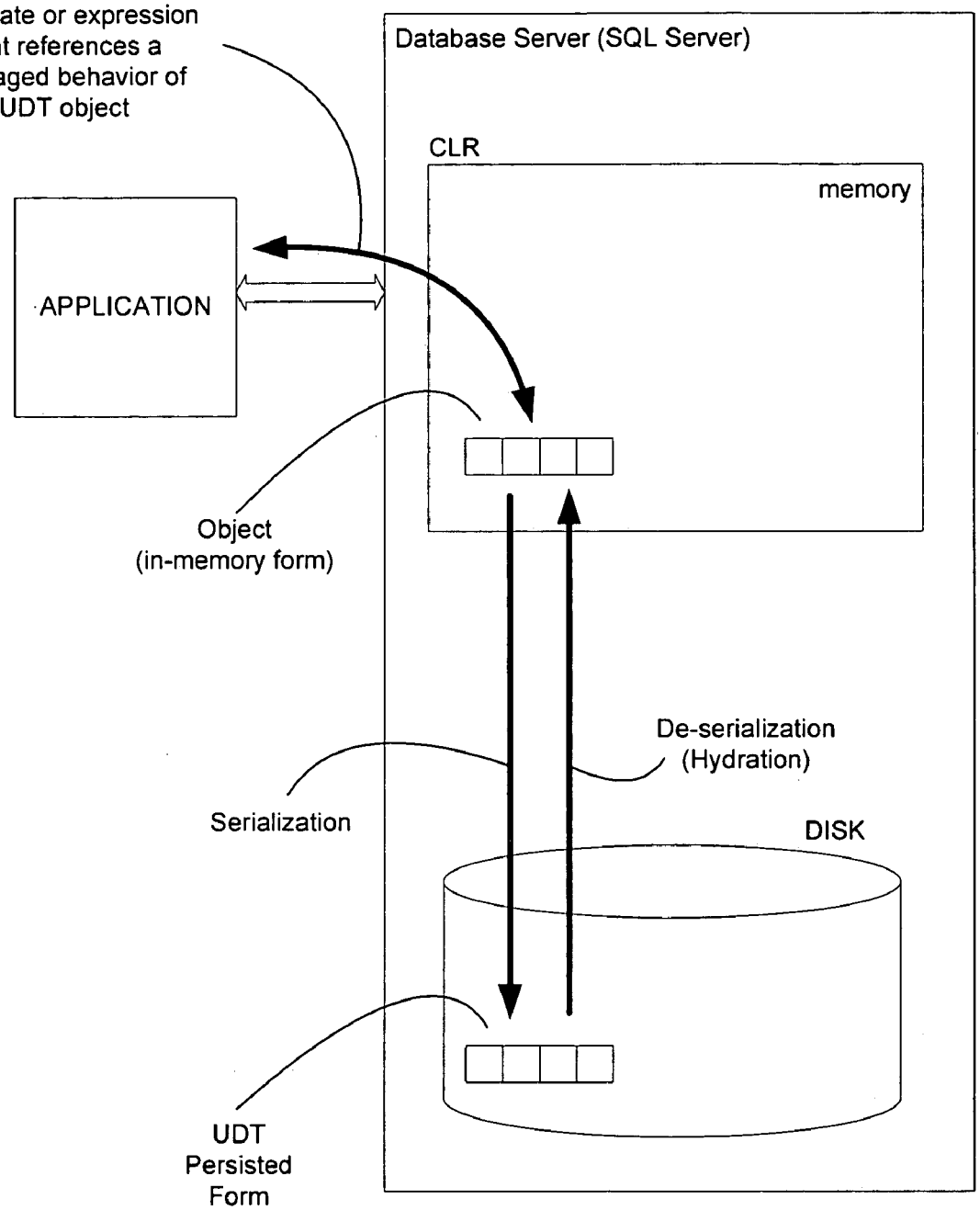
FIG. 2 is a block diagram illustrating the serialization and deserialization of an instance of a type that has been instantiated in managed code.
Figure 3:
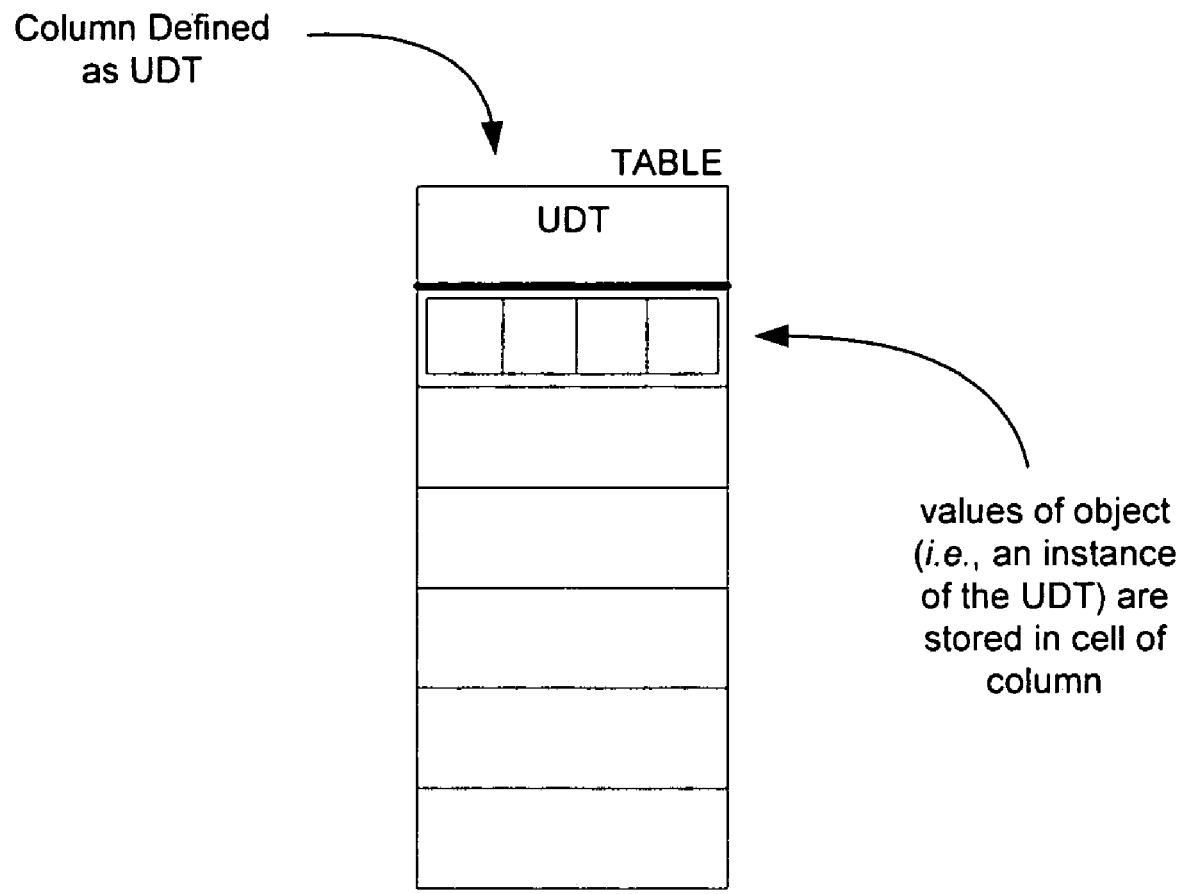
FIG. 3 is a diagram illustrating a database table in which an object of a User Defined Type has been persisted.
Figure 4:
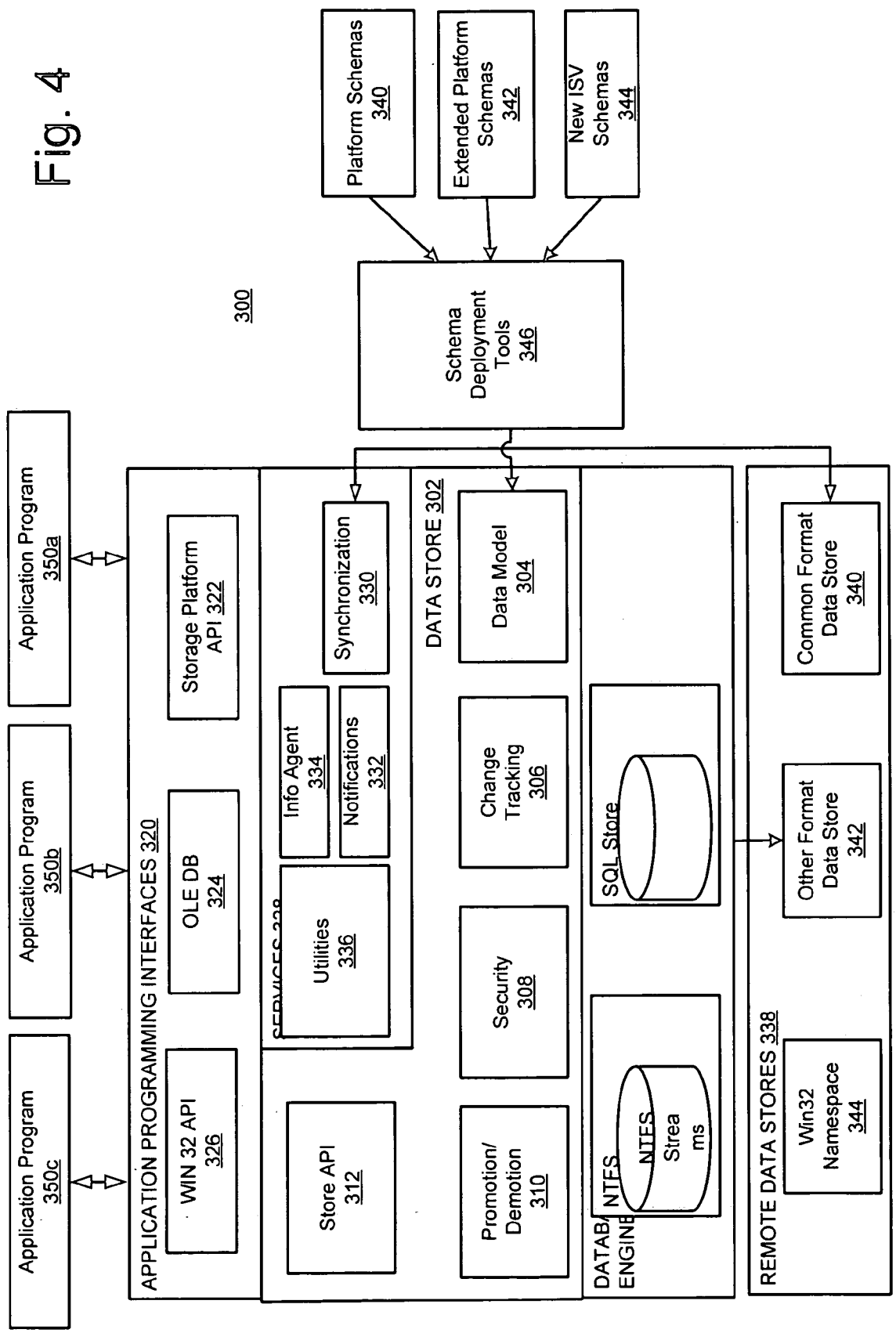
FIG. 4 is a block diagram illustrating an exemplary storage platform which may take advantage of the features of the present invention.
Figures 5, 6:
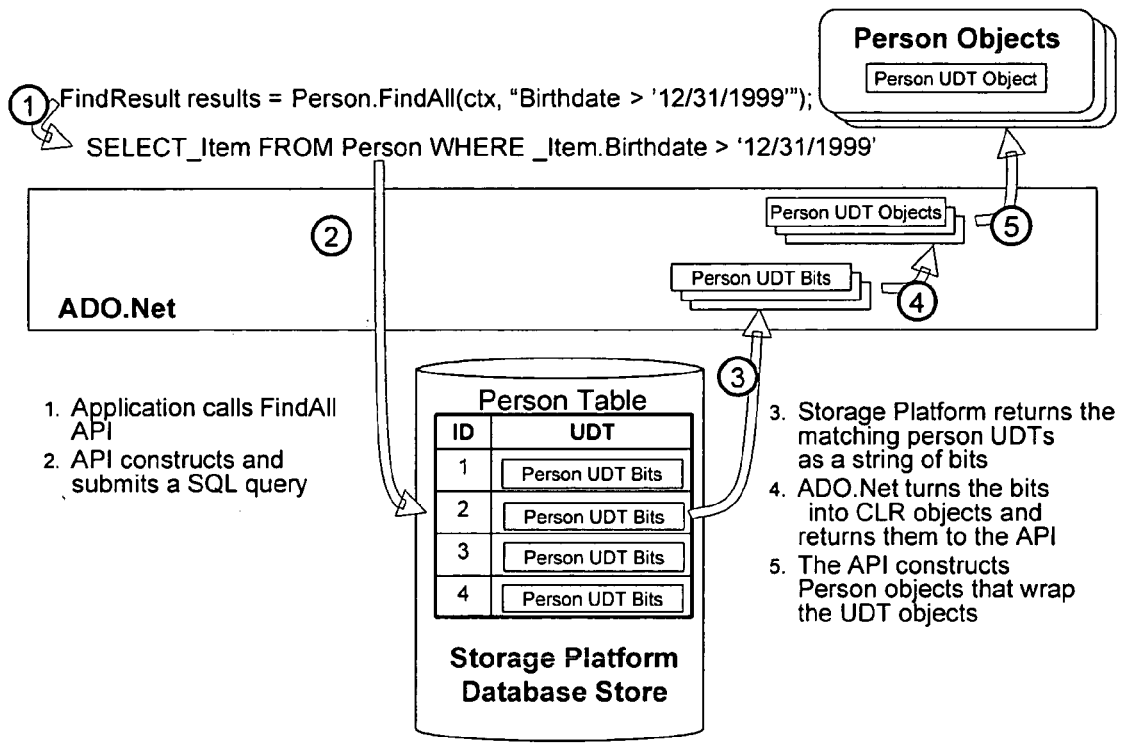
FIG. 5 is a diagram illustrating a process for executing a query against persisted objects of a user defined type in the context of the storage platform illustrated in FIG. 4.
FIG. 6 is an exemplary, partial code segment illustrating a managed code class definition for a user defined type called "Person"

FIG. 6 is an exemplary, partial code listing of a definition of a user defined type, illustrating the designation of a field of the type as a field that is to be stored outside of the database store when an instance of the type is persisted in the store, in accordance with an embodiment of the present invention. Specifically, a CLR class for a user defined type called "Person" is shown; the syntax is that used by the SQL SERVER database engine, as described above in the background of the invention. However, it is understood that the present invention is by no means limited to use with the SQL SERVER database engine, but rather, can be employed in the context of any database management system that supports user defined types.

The CLR class shown in FIG. 6 defines two fields for the Person type, one called "FirstName," which is defined as having data type SqlString, and one called "PhotoFS," which is defined as having data type SqlBytes. It is understood that a complete CLR class definition for a user-defined type in SQL SERVER would have additional fields and methods, in accordance with the requirements discussed above in the Background section (and as illustrated in the exemplary code listing of FIG. 1). The PhotoFS data field might hold, for example, image data comprising a photograph of the Person that an instance of this type might represent. Such data is an example of the kind of large data type to which the present invention can be advantageously applied.

According to the invention, in this example, the PhotoFS field of the Person type is designated as a field that is to be stored outside of the database store when an instance of the type is persisted in the store. Specifically, in the present embodiment, this is accomplished by annotating the field of the CLR class definition of the UDT with a custom attribute that provides the designation. In particular, a new property of the SqlUdtField( ) custom attribute described above in the Background of the invention has been created. The new property is called "IsFilestream." A value of "true" for that property (e.g., IsFilestream=true) indicates that this field of the Person type shall be stored as a file outside of the database store in accordance with the present invention. It is understood, however, that the particular manner in which a field is so designated is not limited to this exemplary mechanism. Rather, any form of annotation to the definition of a user defined type that can be recognized by the underlying database system can be employed. The annotations to the fields of a user defined type, including the IsFilestream property of the SqlUDTField( ) custom attribute, define a set of metadata associated with the defined type.

In the present embodiment, the IsFilestream property may only be applied to fields of type SqlBytes. In other embodiments, however, the property may be applied to fields of other data types, as desired.

Further according to the present invention, when the CLR class for a UDT is compiled and then registered with the database server, for example, using the T-SQL script command CREATE TABLE as described above, the database engine stores the metadata derived from the annotations to the type definition in a system catalog in order to maintain awareness of the structural layout of the fields of instances of the UDT within the database store. In particular, this metadata will reflect any field that has been annotated with the IsFilestream=true property.

Figure 7:
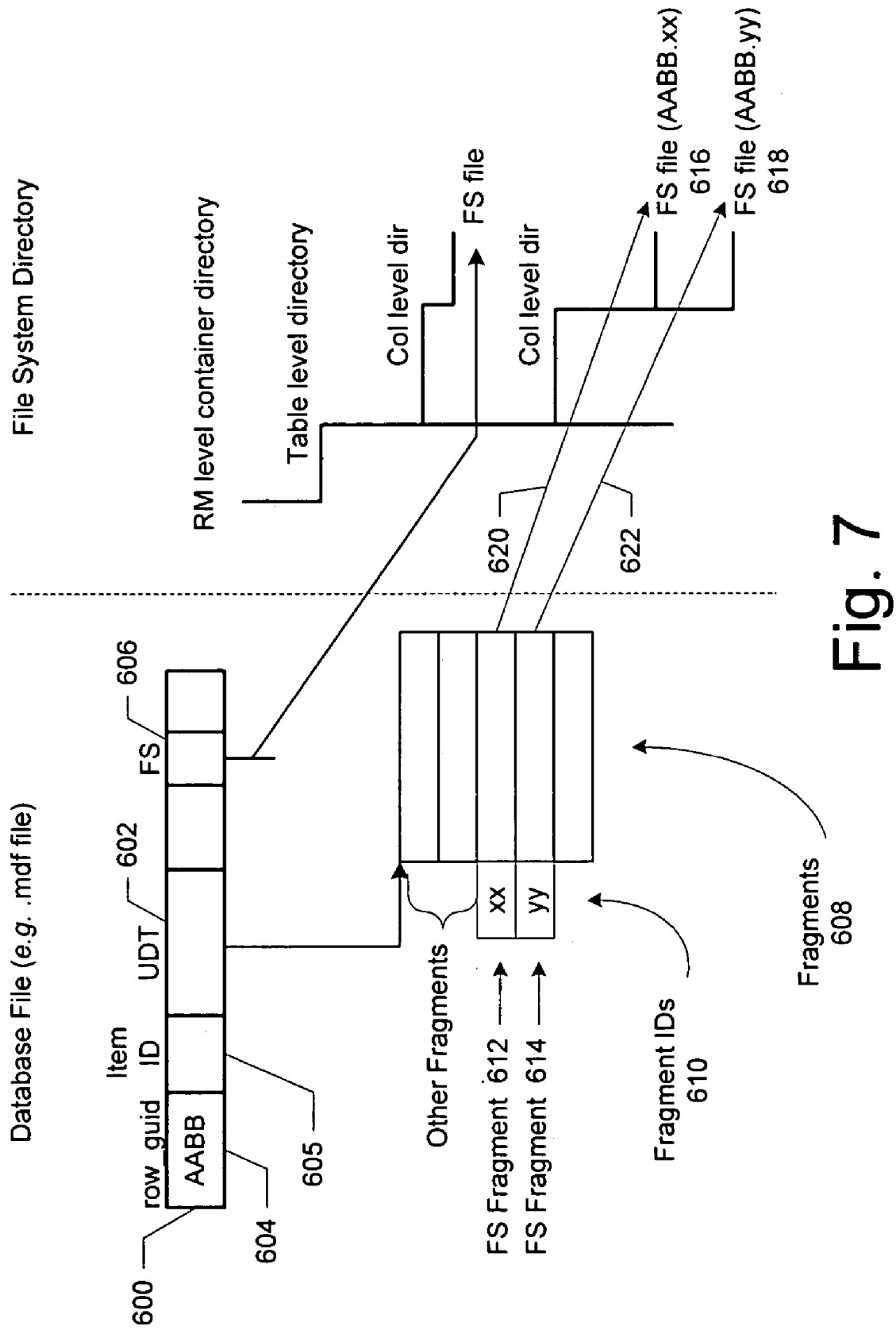
FIG. 7 is a diagram illustrating one embodiment of the system and method of the present invention.

Referring to FIG. 7, an exemplary row 600 of a table within the database store is shown. This table may be used, for example, to store instances of the Person UDT defined by the CLR class illustrated in FIG. 6. The table comprises a column 604 containing a unique identifier for the particular row within the table (i.e., "row_guid"), a column 605 containing an identifier associated with the instance of a UDT (e.g., the Item_ID associated with an instance of a WinFS Item type), and a column 602 that contains the actual serialized values of the fields of the instance of the UDT. In addition to other columns, the table may contain a column 606 defined to hold traditional SQL SERVER FILESTREAM data.

The serialized data (i.e., the values of the fields) of the instance of the UDT that occupies the UDT column 602 of this row of the table is arranged in a series of fragments 608. In the present embodiment, the layout of these fragments is controlled by the SqlUdtField( ) and SqlUdtProperty( ) attributes with which the fields and behaviors of the UDT were annotated as described above.

In the present embodiment, each field of the UDT that was designated as one that should be stored separately from the rest of the serialized data of the UDT outside of the database store is allocated a separate fragment within the stored layout of the UDT. For example, if two fields of the UDT were so designated, those fields may be allocated as fragments 612 and 614, respectively. Additionally, in the present embodiment, those fragments are each assigned a unique identifier, e.g., fragment IDs 610. For example, the fragment 612 may be assigned a fragment ID of "xx," whereas the fragment 614 may be assigned a fragment ID of "yy." For purposes of convenience of discussion only, a field of a UDT that has been designated as one to be stored separately from the other fields of the UDT as a file outside of the database store in accordance with the present invention shall be hereinafter referred to as a "Filestream field" of the UDT. Such reference is not intended to be limiting in any way.

Further according to the present invention, instead of storing the data of each of those fields of the instance of the UDT in the allocated fragments within the table of the database store, the data of such a field is stored outside of the database store in a file within the file system of the computer on which the database store is implemented. In the present embodiment, the fragment stores only a reference to the file, which reference defines a link to the file. For example, the data for the field that is allocated fragment 612 is stored instead in a file 616. The fragment contains a reference to the location of the file 616 within the file system, as indicated by the arrow 620. Similarly, the data for the field that is allocated fragment 614 is stored instead in a file 618. Again, the fragment 614 contains a reference to the file, as indicated by the arrow 622. Any number of fields may have been designated in this manner, and the data for each such field would be stored in a respective file within the file system directory in this manner.

In the present embodiment, each UDT is assigned a different column-level directory within the computer file system. The naming convention for a file that contains the data of a Filestream field of an instance of a given UDT is[row_guid][fragment_ID]. In the example shown, the serialized data of an instance of the Person UDT is stored in a row of the table that is assigned a row_guid of "AABB". Fragment 612 is assigned a fragment ID of "xx," and fragment 614 is assigned a fragment ID of "yy." Accordingly, the filename for the file referenced by fragment 612 is "AABB.xx," whereas the filename for the file referenced by fragment 614 is "AABB.yy."

It is important to note that even though the data for the corresponding Filestream fields of the instance of the UDT are stored as files outside of the database store, they are subject to the operations of the database engine as if stored within the database table. For example, as embodied in the SQL SERVER database engine, the T-SQL commands INSERT and UPDATE can be used to insert new data or update existing data into a file that stores the data of a Filestream field of an instance of a UDT, just as if the data field were stored within the database table. Similarly, the T-SQL DELETE command can be used to delete a row containing a UDT that has one or more Filestream fields stored in separate files; deleting the row deletes the referenced files as well. Filestream fields within a UDT that are stored in separate files can also be queried like any other column.

As also illustrated in FIG. 7, the method of the present invention described above can also co-exist with the traditional FILESTREAM column type provided in SQL SERVER. For example, as shown in FIG. 7, a column 606 of the table can be defined as type "FILESTREAM". (FS). When a column is defined as type "FILESTREAM," the data in a given cell of that column is stored in a separate file in a column-level directory associated with that column of the table. It will be appreciated that the present invention improves upon this capability by providing the ability to store the data of an individual field of a UDT object in a separate file outside of the database store.

The data of a Filestream field of a UDT object that has been stored in a separate file in accordance with the present invention can be retrieved in two ways. First, as mentioned above, the data can be accessed using a traditional T-SQL query. For example, assume that the table in which an instance of the Person type (as defined in FIG. 6) is stored is named "Person_sql," and that the column 602 that contains the serialized data of the instance of the Person UDT is named "Person_col." The following query will return the data of the field named PhotoFS of the instance, which will have been stored as a separate file in accordance with the present invention:

SELECT Person_col.PhotoFS FROM Person_SQL WHERE FirstName="Steve" When the database engine receives such a query, it obtains the file system path name to the file in which the PhotoFS field of the instance of the Person type is stored. The path name is obtained from the corresponding fragment of the Person UDT object that satisfies the query. Of course, multiple objects of the Person UDT may satisfy such a query. For each object that satisfies the query, the database engine will then make an appropriate call to an application programming interface of the file system (e.g., CreateFile in the Win32 API) using the obtained path name of the file containing the data of the PhotoFS field. The database engine will then read the file, return the data to the application, and then close the file.

According to another aspect of the invention, applications are also able to access such files directly via the file system of the computer. Specifically, an application can generate a call, via the application programming interface to the file system, to open such a file directly. The call will identify the corresponding Filestream field of the object by its identity within the database store. Based on the identity of the field of the object within the database store, a file system path to the file containing the data of that field is determined. The call to open the file is then executed using the determined path.

Figure 8:
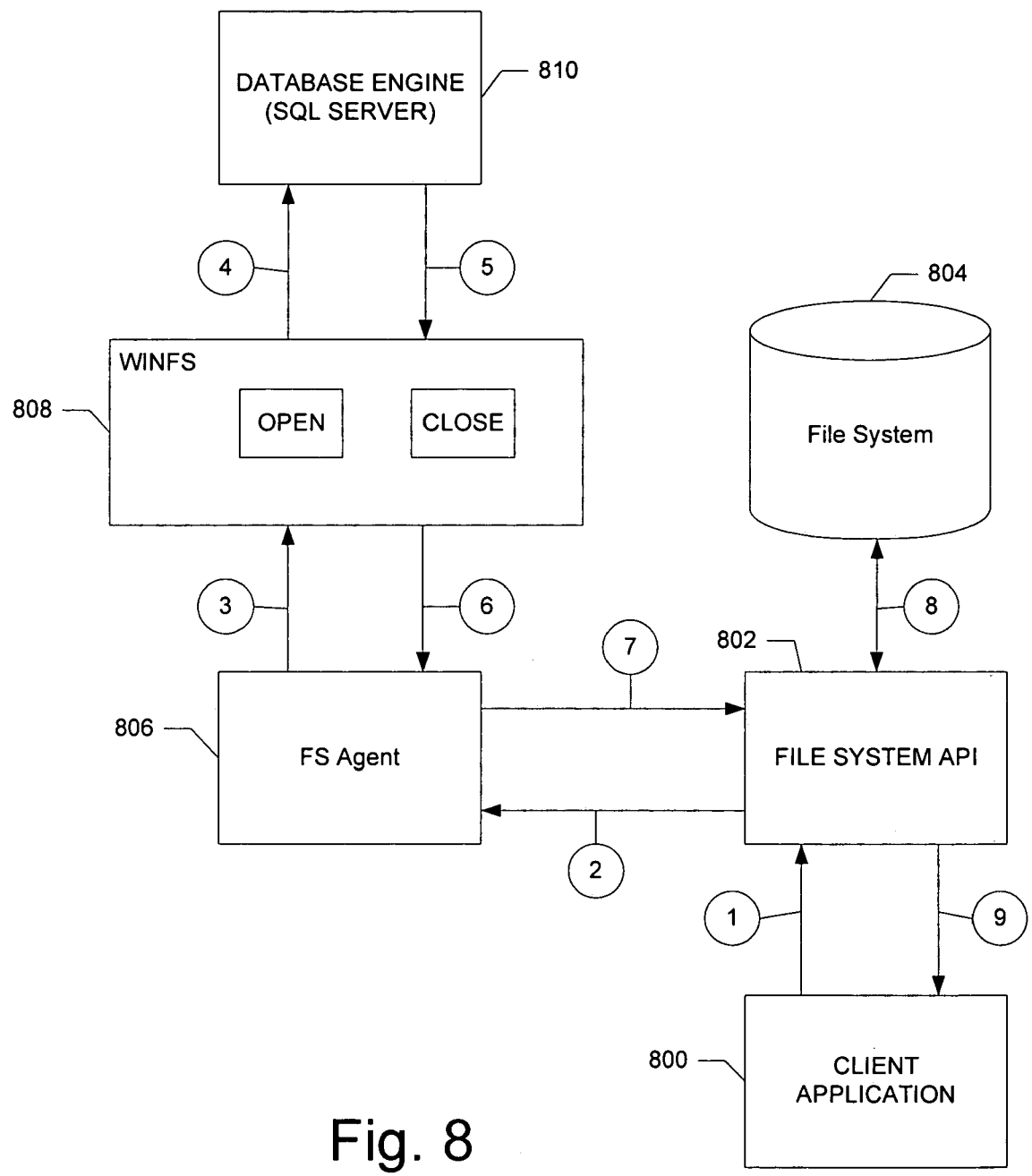
FIG. 8 is a block diagram illustrating a system and method of "out of band" access to a file containing data of a field of an instance of a user defined type, in accordance with an embodiment of another aspect of the present invention.

An embodiment of this aspect of the present invention is illustrated in FIG. 8. In this example, this aspect of the present invention is implemented in the context of the WinFS storage platform described above in the Background section. Such a capability is particularly advantageous in the WinFS platform. It is understood, however, that this aspect of the present invention can be implemented in any environment in which direct access to a file containing the data of a field of an instance of a user defined type is needed.

Referring to FIG. 8, in accordance with the present invention, a client application 800 may desire direct access to a file containing the data of a Filestream field of an instance of a user defined type, which field has been stored in a file within the file system 804 of a computer system on which the WinFS storage platform 808 is implemented. As described above, the WinFS storage platform is implemented on a database engine 810, such as the SQL SERVER database engine.

According to this further aspect of the present invention, a client application that could otherwise access the fields of a WinFS Item that has been persisted as a UDT object in the database store (not shown) using the WinFS APIs, instead may request access, via the application programming interface 802 of the file system 804, directly to a Filestream field of the Item (i.e., UDT) that has been stored separately in the file system 804. In the exemplary embodiment shown in FIG. 8, the client application initiates this process in step (1) by calling the CreateFile interface of the Win32 API, passing a path name to the Win32 API that identifies the requested data based on the identity of the corresponding field in the instance of the persisted Item (UDT). For example, in accordance with WinFS naming conventions, a path name identifying a field of an Item in the database store (including one that may have been stored separately in a file within the file system in accordance with the method described above) may have the following form:

\\?\UNC\machinename\sharename\Item_IdValue\[typename].field name.(locator)[typename].fieldname It is understood, however, that this format is merely exemplary and that the actual delimiters and format may be different in other embodiments, without deviating from the scope of the present invention.

With reference to the exemplary format above, the first part of the path name format begins with:

\\?\unc\machinename\defaultstore\ . . .

where machinename is the name of the machine on which the WinFS platform is running, and defaultstore is the share name associated with the root of the database in which instances of Items are stored. Since WinFS supports multiple database stores, defaultstore will be replaced with the share associated with a particular database or with the share associated with a portion of the database. The . . . \\?\unc\ . . . portion of the path is used to allow the length of the string holding the path to be up to 32 KB, rather than limited to the 256 byte (or so) limit that a normal path name is subject to. The path name has to be Unicode to work in this format. This portion of the path name thus provides direction to a certain database/share on a specific machine.

The next portion of the path name ( . . . \Item_IdValue . . . ) identifies the type of the object as an "Item," followed by the Item_ID value(s) of the object(s) involved. Note that the present invention can be applied to Item Extensions and Relationships in WinFS as well, as Item Extensions and Relationships are also mapped to UDTs in a WinFS database store. In the case of an Item Extension, this portion of the path name would be replaced with ( . . . \Extension_IdValue . . . ). In the case of a Relationship, this portion of the path name would be replaced with ( . . . \Relationship_IdValue . . . ).

The last portion of the path name,

. . . \[typename].fieldname.(locator)[typename].fieldname, identifies the particular field of the Item, Item Extension, or Relationship UDT that is the subject of the call. It contains repeated typename-fieldname-locator triples. The typename is enclosed in square brackets [ ], and the locator, if present is enclosed in parentheses. The typename is the name of the type of the field or the name of the type of the object root. The fieldname is the name of the field. And, if the field has multiple instances, as with an array or collection, the locator indicates which item within the field. If the UDT consists of nested levels of objects, additional typename-fieldname-locator triples will be present to specify the fields within fields, eventually stopping at a field that has the IsFilestream=true property.

Continuing the example of FIGS. 6 and 7, a path name to the PhotoFS field of an instance of the Person UDT may be specified as follows:

\\?\UNC\localhost\defaultstore\ItemID\Person.PhotoFS.

where ItemID is the globally unique identifier (guid) assigned to the particular instance of the Person type.

Because the WinFS path name for a Filestream field of an Item that has been persisted as a separate file outside of the database store can not be resolved properly by the computer file system, in accordance with the present invention, it is translated to the equivalent file system path name. In the present embodiment, this process is initiated by a software component called "FS Agent." Of course, in other embodiments, other software components may be employed to perform this function. As illustrated at step (2), when the File System API 802 receives a CreateFile command from the client application that includes the WinFS path name, it recognizes it as such from the "machinename/defaultstore" portion of the WinFS path name. All file requests received with that path name are forwarded to the FS Agent.

At step (3), the FS Agent issues an "OPEN" call to the WinFS API 808, passing the WinFS path name of the Item field. At step (4), the WinFS platform identifies the Item and field from the WinFS path name and then passes this information to the database engine in a GetPathName( ) request. GetPathName( ) is a database engine function that returns the Win32 file system pathname for a Filestream field of a UDT object that has been stored separately from the database store in the manner described above. The WinFS platform also enforces any security constraints on access to the fields of the Item.

At step (5), the database engine responds to the GetPathName( ) request by performing a table look-up in the table in which the UDT object that is the subject of the request is stored. The database engine positions to the correct row of the table and then to the serialized fragments of the UDT object within that row. For the Filestream field in question, the database engine extracts from its corresponding fragment the real file system path to the file in which the data for that field is stored. The database engine sends the real path back to the WinFS API 808. At step (6), WinFS passes the file system path back to the FS Agent 806, and at step (7), the FS Agent calls the File System API 802 to open the file, passing the real file system path in the request. At step (8), the File System API 802 obtains a handle to the file and passes it back to the client (step (9)) as it normally would when a CreateFile call is made to the File System API 802.

At this point, the client application 800 can read and write to the file via normal File System API calls (e.g., Win32 API File I/O calls). When the client application 800 is finished with the file, it issues a CLOSE call to the File System API. This call is again intercepted by the FS Agent 806. FS Agent 806 issues a "CLOSE" call to the WinFS API 808 to request that the file be closed. The WinFS platform 808 models this operation as an update to the persisted Item, performing any associated change tracking and other functions associated with the update. The database engine then does its own update processing on the persisted UDT object. Once this processing is complete, control returns to the FS Agent 806, which calls the File System API 802 to perform its normal file close operation on behalf of the client application 800.

Thus, through the method described above, a client application is provided with "out of band" access to a Filestream field of a persisted UDT, which field has been stored as a separate file within the file system of the computer on which the database management system is implemented.

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for persisting objects in a database store in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the object persistence methods of the present invention.

Figure 9:
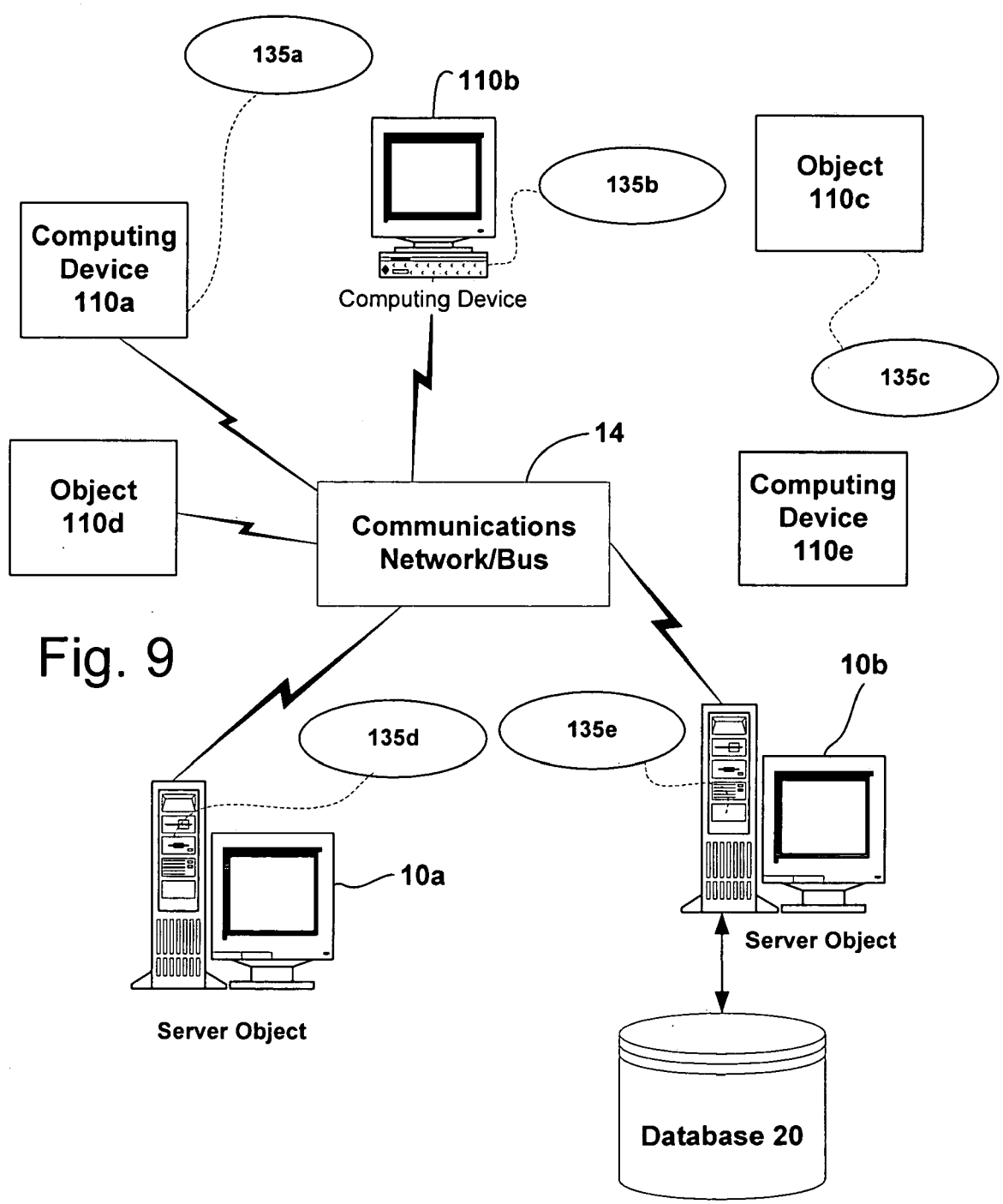
FIG. 9 is a block diagram representing an exemplary network environment having a variety of computing devices in which the present invention may be implemented.

FIG. 9 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 9, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the object persistence methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 9, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the object persistence techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the persistence mechanism of the invention may be distributed across multiple computing devices.

Client(s) and server(s) may communicate with one another utilizing the functionality provided by a protocol layer. For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 9 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to maintain a persisted object.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other like devices, and databases 20.

Figure 10:
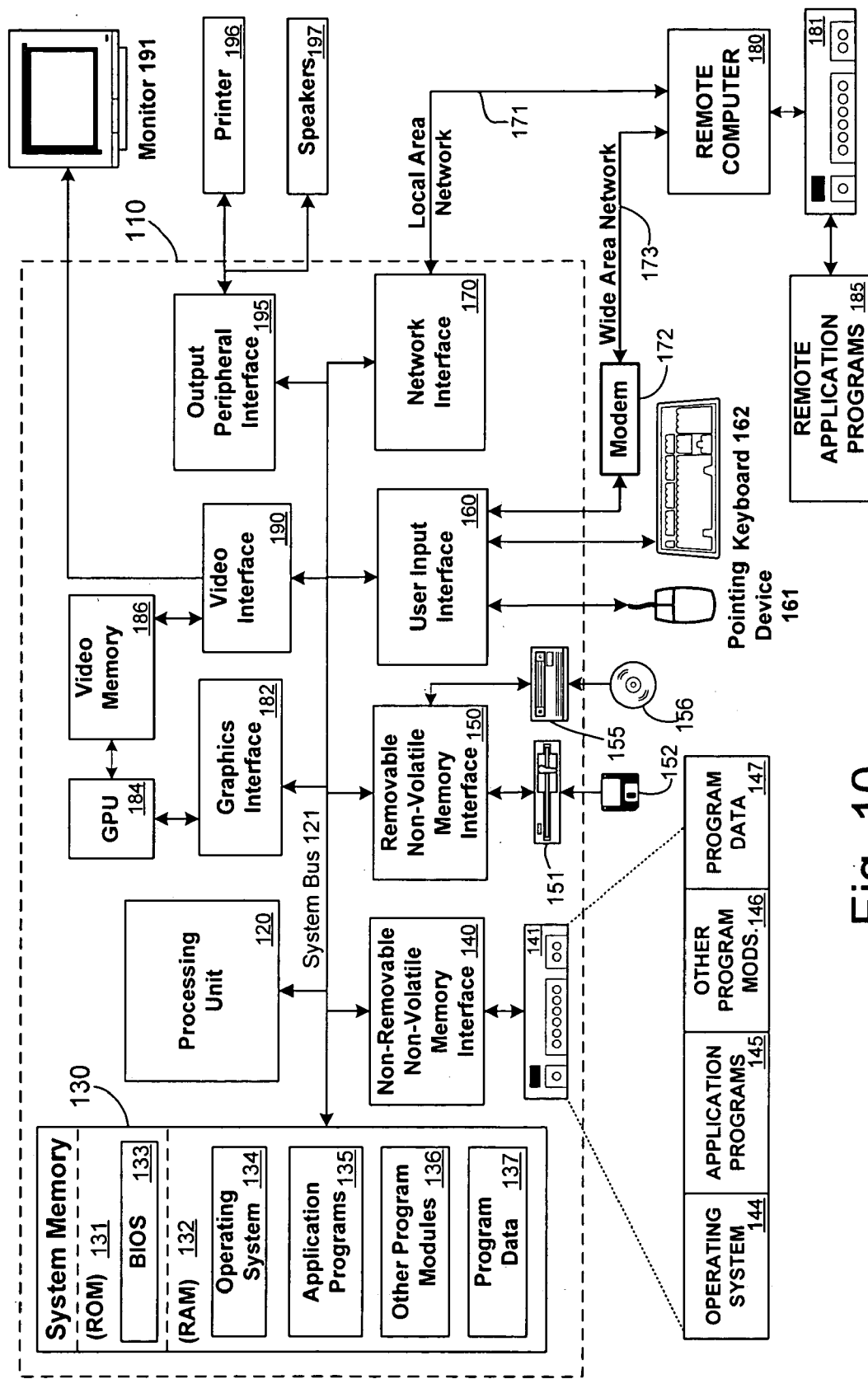
FIG. 10 is a block diagram representing an exemplary computing device in which the present invention may be implemented.

FIG. 10 and the following discussion are intended to provide a brief general description of a suitable computing device in connection with which the invention may be implemented. For example, any of the client and server computers or devices illustrated in FIG. 9 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 10 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 10, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 8 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10 provide storage of computer readable instructions, data structures, program modules and other data for the computer 110. In FIG. 10, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

As the foregoing illustrates, the present invention is directed to a system and method for storing and retrieving a field of an instance of a user defined type that is persisted in a database store, outside of the database store as a separate file within the file system of the computer on which the database store is implemented. The present invention is particularly advantageous for storing large data types as fields of a user defined type within a database management system. It is understood that changes may be made to the embodiments described above without departing from the broad inventive concepts thereof. For example, while an embodiment of the present invention has been described above as being implemented in Microsoft's SQL SERVER database management system, it is understood that the present invention may be embodied in any database management system that supports the creation of user defined types. Additionally, while certain aspects of the present invention have been described as being embodied in the context of the WinFS storage platform described above, it is understood that those aspects of the present invention are by no means limited to implementation in that environment. Rather, the methods and systems of the present invention can be embodied in any system in which storage and retrieval of a field of an instance of a user defined type is desirable. Accordingly, it is understood that the present invention is not limited to the particular embodiments disclosed, but is intended to cover all modifications that are within the spirit and scope of the invention as defined by the appended claims.

What is claimed:

1. In a computer system in which an object that is an instance of a user defined type can be persisted in a database store, wherein a definition of the user defined type comprises a plurality of fields, each of said plurality of fields being assigned any one of a plurality of data types supported by the database store, at least one of said plurality of fields of the definition being designated as containing data that is to be stored as a file outside of the database store separately from the data of the other of said plurality of fields of the type definition while maintaining the assigned data type of said at least one designated field, a method comprising:

creating a unique dedicated directory within a file system of the computer system for storing files containing the data of said at least one designated field of instances of the user defined type;

receiving requests to store objects that are different instances of the user defined type, and for each such request to store an object that is an instance of the user defined type:

determining from the designation of said at least one field of the instance of the user defined type that the data of that field is to be stored as a file outside of the database storing the data of said at least one designated field of the instance of the user defined type as a respective file within the created directory; and storing the data in each of the other fields of said plurality of fields of the instance of the user defined type within the database store.

2. The method recited in claim 1, wherein a location of the created directory within the file system of the computer system is based at least in part upon a logical structure of the database store.

3. The method recited in claim 2, wherein the logical structure of the database store comprises one or more tables, and wherein the location of said created directory within the file system is associated with one of said one or more tables.

4. The method recited in claim 2, wherein the logical structure of the database store comprises one or more tables, each comprising one or more columns, and wherein the location of said created directory within the file system is associated with one of said columns.

5. In a computer system in which an object that is an instance of a user defined type can be persisted in a database store, wherein a definition of the user defined type comprises a plurality of fields, each of said plurality of fields being assigned any one of a plurality of data types supported by the database store, at least one of said plurality of fields of the definition being designated as containing data that is to be stored as a file outside of the database store separately from the data of the other of said plurality of fields of the type definition while maintaining the assigned data type of said at least one designated field, a method comprising:
    receiving a request to store an object that is an instance of the user defined type;
    determining from the designation of said at least one field that the data of that field is to be stored as a file outside of the database store;
    storing the data in said at least one designated field of said plurality of fields of the instance of the user defined type as a file outside of the database store;
    storing the data in each of the other fields of said plurality of fields of the instance of the user defined type within the database store;
    receiving a call from an application, via an application programming interface to a file system of the computer system, to open the file in which the data of said at least one field is stored outside the database store, wherein the call identifies the field of the object by its identity within the database store;
    determining from the identity of the field of the object within the database store a path within the file system of the computer system to the file containing the data of that field of the object; and
    executing the call to open the file using the determined path.

6. The method recited in claim 5, further comprising providing a link between the data of the fields of the object that are stored within the database store and the data of the field that is stored as a file outside of the database store.

7. The method recited in claim 5, wherein the data of the fields of the object that are stored within the database store are stored as fragments within a column of a table of the database, the column having been designated as the user defined type.

8. The method recited in claim 7, wherein a unique identifier associated with the object is stored in another column of the table in a same row as the data of the fields of the object.

9. The method recited in claim 5 wherein the file system of the computer system comprises a Microsoft NTFS file system and wherein the application programming interface to the file system comprises the Win32 application programming interface.

10. The method recited in claim 5, wherein the type of the object is defined as a class in managed code.

11. The method recited in claim 5, further comprising:
    performing a database operation on the data of said at least one designated field of the instance of the user-defined type, wherein the database operation is performed on the data of said at least one designated field as if it were stored within the database store.

12. The method recited in claim 11, wherein the database operation may comprise one of an INSERT, UPDATE or DELETE operation.

13. A computer readable storage medium having program code stored thereon for use in a computer system in which an object that is an instance of a user defined type can be persisted in a database store, wherein a definition of the user defined type comprises a plurality of fields, each of said plurality of fields being assigned any one of a plurality of data types supported by the database store, at least one of said plurality of fields of the definition being designated as containing data that is to be stored as a file outside of the database store separately from the data of the other of said plurality of fields of the type definition while maintaining the assigned data type of said at least one designated field, said program code, when executed on a computer system, causing the computer system to:
    create a unique dedicated directory within a file system of the computer system for storing files containing the data of said at least one designated field of instances of the user defined type;
    receive requests to store objects that are different instances of the user defined type, and for each such request to store an object that is an instance of the user defined type:
        determine from the designation of said at least one field that the data of that field is to be stored as a file outside of the database store;
        store the data of said at least one designated field of the instance of the user defined type as a respective file within the created directory; and
        store the data in each of the other fields of said plurality of fields of the instance of the user defined type within the database store.

14. The computer-readable storage medium recited in claim 13, wherein a location of the created directory within the file system of the computer system is based at least in part upon a logical structure of the database store.

15. The computer-readable storage medium recited in claim 14, wherein the logical structure of the database store comprises one or more tables, and wherein the location of said created directory within the file system is associated with one of said one or more tables.

16. The computer-readable storage medium recited in claim 14, wherein the logical structure of the database store comprises one or more tables, each comprising one or more columns, and wherein the location of said created directory within the file system is associated with one of said columns.

17. A computer readable storage medium having program code stored thereon for use in a computer system in which an object that is an instance of a user defined type can be persisted in a database store, wherein a definition of the user defined type comprises a plurality of fields, each of said plurality of fields being assigned any one of a plurality of data types supported by the database store, at least one of said plurality of fields of the definition being designated as containing data that is to be stored as a file outside of the database store separately from the data of the other of said plurality of fields of the type definition while maintaining the assigned data type of said at least one designated field, said program code, when executed on a computer system, causing the computer system to:
    receive a request to store an object that is an instance of the user defined type;

determine from the designation of said at least one field that the data of that field is to be stored as a file outside of the database store;

store the data in said at least one designated field of said plurality of fields of the instance of the user defined type as a file outside of the database store;

store the data in each of the other fields of said plurality of fields of the instance of the user defined type within the database store;

receive a call from an application, via an application programming interface to a file system of the computer system, to open the file in which the data of said at least one field is stored outside the database store, wherein the call identifies the field of the object by its identity within the database store;

determining from the identity of the field of the object within the database store a path within the file system of the computer to the file containing the data of that field of the object; and executing the call to open the file using the determined path.

18. The computer readable storage medium recited in claim 17, wherein the program code further causes the computer system to provide a link between the data of the fields of the object that are stored within the database store and the data of the field that is stored as a file outside of the database store.

19. The computer readable storage medium recited in claim 17, wherein the program code further causes the data of the fields of the object that are stored within the database store to be stored as fragments within a column of a table of the database, the column having been designated as the user defined type.

20. The computer readable storage medium recited in claim 19, wherein the program code further causes the computer system to store a unique identifier associated with the object in another column of the table in a same row as the data of the fields of the object.

21. The computer readable storage medium recited in claim 17 wherein the file system of the computer system comprises a Microsoft NTFS file system and wherein the application programming interface to the file system comprises the Win32 application programming interface.

22. The computer readable storage medium recited in claim 17, wherein the type of the object is defined as a class in managed code.

23. The computer readable storage medium recited in claim 17, wherein the program code further causes the computer system to:

perform a database operation on the data of said at least one designated field of the instance of the user-defined type, wherein the database operation is performed on the data of said at least one designated field as if it were stored within the database store.

24. The computer readable storage medium recited in claim 23, wherein the database operation may comprise one of an INSERT, UPDATE or DELETE operation.

* * * * *